(12) United States Patent
Groll et al.

(10) Patent No.: US 12,521,796 B2
(45) Date of Patent: Jan. 13, 2026

(54) NON-ROTATING BORING TOOL FOR INTERNAL TURNING AND A BORING ARRANGEMENT COMPRISING SUCH A BORING TOOL

(71) Applicant: SECO TOOLS TOOLING SYSTEMS, Bouxwiller (FR)

(72) Inventors: Yannick Groll, Bouxwiller (FR); Pascal Krumhorn, Bouxwiller (FR); Mathieu Ostermann, Bouxwiller (FR)

(73) Assignee: SECO TOOLS TOOLING SYSTEMS, Bouxwiller (FR)

( * ) Notice: Subject to any disclaimer, the term of this patent is extended or adjusted under 35 U.S.C. 154(b) by 504 days.

(21) Appl. No.: 18/009,948

(22) PCT Filed: Jun. 9, 2021

(86) PCT No.: PCT/EP2021/065436
§ 371 (c)(1),
(2) Date: Dec. 12, 2022

(87) PCT Pub. No.: WO2022/002544
PCT Pub. Date: Jan. 6, 2022

(65) Prior Publication Data
US 2023/0219142 A1  Jul. 13, 2023

(30) Foreign Application Priority Data

Jun. 30, 2020 (EP) .................................... 20315331

(51) Int. Cl.
*B23B 27/00* (2006.01)
*B23B 29/02* (2006.01)

(52) U.S. Cl.
CPC .......... *B23B 27/007* (2013.01); *B23B 27/002* (2013.01); *B23B 29/02* (2013.01); *B23B 29/022* (2013.01)

(58) Field of Classification Search
CPC ..... B23B 27/002; B23B 27/007; B23B 29/02; B23B 29/022; B23B 29/025
See application file for complete search history.

(56) References Cited

U.S. PATENT DOCUMENTS 5,170,103 A * 12/1992 Rouch ................... F16F 15/005
                                                               318/128
5,913,955 A *  6/1999 Redmond ............. B23B 29/022
                                                               409/141

(Continued)

FOREIGN PATENT DOCUMENTS

CN          101966597           2/2011
CN          106270592 A  *  1/2017  ........... B23B 29/022

(Continued)

*Primary Examiner* — Jennifer H Gay
(74) *Attorney, Agent, or Firm* — Corinne R. Gorski (57) ABSTRACT

A non-rotating boring tool for internal turning includes a boring bar having an elongated body, a cutting element with a rake side, a relief surface and a cutting edge, and an electrically controlled vibration actuator for active vibration damping of the boring bar. Moreover, when seen in a cross-sectional plane that is perpendicular to a longitudinal axis of the elongated body and intersecting the cutting edge in a radially outermost point, straight and imaginary first and second reference lines intersect the cutting edge in the radially outermost point with the first reference line extending at an angle of 6° to the relief surface on the outside of the cutting element, and the second reference line extending between the rake side and the relief surface at an angle of 10-40° to the first reference line. The actuator is arranged with its working axis extending in parallel with the second reference line.

15 Claims, 9 Drawing Sheets

(56) References Cited

U.S. PATENT DOCUMENTS

| | | | | |
|---|---|---|---|---|
| 6,009,985 | A * | 1/2000 | Ivers | F16F 7/104 244/54 |
| 6,694,213 | B2 * | 2/2004 | Claesson | F16F 15/005 82/158 |
| 7,234,379 | B2 * | 6/2007 | Claesson | B23Q 11/0039 82/158 |
| 7,490,536 | B2 * | 2/2009 | Murakami | B23B 29/022 82/158 |
| 7,591,209 | B2 * | 9/2009 | Murakami | B23B 29/022 82/158 |
| 10,384,267 | B2 * | 8/2019 | Umstadt | F16F 15/02 |
| 2002/0036091 | A1 * | 3/2002 | Claesson | F16F 15/005 82/904 |
| 2005/0109182 | A1 * | 5/2005 | Murakami | B23B 27/002 83/651 |
| 2007/0089574 | A1 * | 4/2007 | Murakami | B23B 29/022 82/158 |
| 2016/0067787 | A1 * | 3/2016 | Giannetti | B23B 27/002 29/407.01 |
| 2018/0093329 | A1 * | 4/2018 | Umstadt | F16F 15/08 |
| 2023/0219142 | A1 * | 7/2023 | Groll | B23B 27/002 408/199 |
| 2023/0234145 | A1 * | 7/2023 | Groll | B23B 27/002 408/143 |
| 2023/0330752 | A1 * | 10/2023 | Groll | B23B 27/002 |
| 2024/0351115 | A1 * | 10/2024 | Groll | B23B 29/022 |

FOREIGN PATENT DOCUMENTS

| | | | | |
|---|---|---|---|---|
| CN | 113145879 | A * | 7/2021 | B23B 29/022 |
| CN | 117340305 | A * | 1/2024 | |
| EP | 1693131 | A1 | 8/2006 | |
| JP | H0780702 | A | 3/1995 | |
| JP | H09183002 | A * | 7/1997 | |
| WO | 2018044216 | A1 | 8/2016 | |

* cited by examiner

NON-ROTATING BORING TOOL FOR INTERNAL TURNING AND A BORING ARRANGEMENT COMPRISING SUCH A BORING TOOL

RELATED APPLICATION DATA

This application is a § 371 National Stage Application of PCT International Application No. PCT/EP2021/065436 filed Jun. 9, 2021 with priority to EP 20315331.7 filed Jun. 30, 2020.

FIELD OF THE INVENTION AND PRIOR ART

The present invention relates to a non-rotating boring tool for internal turning and a boring arrangement comprising such a boring tool.

A boring tool comprising a cantilever boring bar with a cutting element at its free end may be used for performing an internal turning operation on a rotating workpiece of metallic material. An internal turning operation machines an internal surface of a workpiece located in some kind of hole in the workpiece, wherein the boring bar is gradually moved deeper and deeper into the hole in the workpiece while machining the inner surface of the hole. An internal turning operation may for instance be performed in order to enlarge an existing hole in a workpiece or smooth the inner surface of such a hole. During the internal turning operations, the cutting element is subjected to cutting forces from the rotating workpiece, including a radial force directed along a line that extends perpendicularly to the axis of rotation of the workpiece and intersects the axis of rotation and the point of contact between the cutting element and the workpiece and a tangential force directed perpendicularly to the radial force and in the tangential direction of the workpiece surface at the point of contact between the cutting element and the workpiece. These mutually perpendicular cutting forces will induce vibrations in the boring bar, which in its turn may cause noise, impaired surface finish of the workpiece, tool breakage and other undesired effects.

Different types of active damping systems have been developed in order to reduce boring bar vibrations caused by the cutting forces on a cutting element at the outer end of a boring bar during machining of a workpiece. Such an active damping system may comprise at least one vibration sensor for sensing the vibration of the boring bar and at least one electrically controlled vibration actuator for generating vibratory forces in the boring bar, wherein the vibration actuator is controlled by an electronic control unit in dependence on measuring signals from the vibration sensor or sensors in order to introduce counter-vibrations in the boring bar that will interfere with and thereby counteract the vibrations induced in the boring bar by the cutting forces.

An active damping system of the above-mentioned type is disclosed in U.S. Pat. No. 5,170,103 A where a vibration actuator is accommodated in a cavity inside the boring bar.

OBJECT OF THE INVENTION

The object of the present invention is to provide a non-rotating boring tool of the above-mentioned type that has a new and favourable design.

SUMMARY OF THE INVENTION

According to the invention, said object is achieved by means of a non-rotating boring tool, which is to be used for internal turning and comprises:

- a boring bar comprising an elongated body configured for attachment to a support structure of a metal cutting machine, the elongated body having a rear end and an opposite front end; and
- a tool part provided with a cutting element, wherein this tool part is detachably attached to or integrally formed with the front end of the elongated body, the cutting element comprising a rake side, a relief surface and a cutting edge formed at an intersection between the rake side and the relief surface.

To enable the boring tool of the present invention to be defined in an appropriate manner, the following imaginary reference lines are defined in a cross-sectional plane that is perpendicular to a longitudinal axis of the above-mentioned elongated body and intersects the cutting edge in a radially outermost point on the cutting edge:

- a straight and imaginary first reference line L1 which intersects the cutting edge in the radially outermost point and extends at an angle of 6° to the relief surface on the outside of the cutting element, and
- a straight and imaginary second reference line L2 which intersects the cutting edge in the radially outermost point and extends between the rake side and the relief surface at an angle of 10-40° to the first reference line L1. Preferably, the second reference line L2 extends between the rake side and the relief surface at an angle of 10-30° to the first reference line L1.

The boring bar comprises an electrically controlled vibration actuator, in the following referred to as first actuator, for active vibration damping of the boring bar and configured to generate vibratory forces in parallel or substantially in parallel with a working axis of the actuator, wherein this actuator is a single-axis actuator having one single working axis and is arranged in the elongated body with its working axis extending in parallel or substantially in parallel with the above-mentioned second reference line L2.

The relief angle of a cutting element of a non-rotating boring tool to be used for internal turning is normally 6° or close to 6°, which implies that the above-mentioned tangential cutting force on the cutting element will be directed substantially along the first reference line L1 defined above, whereas the above-mentioned radial cutting force on the cutting element will be directed substantially perpendicular to this first reference line L1.

The vibrations induced in the boring bar of a non-rotating boring tool during internal turning are mainly caused by the above-mentioned tangential and radial cutting forces on the cutting element, wherein these forces act on the cutting element at the point of contact between the cutting element and the workpiece, i.e. at the radially outermost point on the cutting edge of the cutting element. The tangential and radial cutting forces $F_t$, $F_r$ on the cutting element are directed in a plane that is perpendicular to the longitudinal axis of the elongated body and intersects the point of contact between the cutting element and the workpiece, i.e. in a plane corresponding to the cross-sectional plane defined above. The resultant force $F_{res}$ (see FIG. 7c) of the radial and tangential cutting forces $F_t$, $F_r$ on the cutting element has its point of application in the radially outermost point on the cutting edge and will extend between the rake side and the relief surface of the cutting element in the same plane as the tangential and radial cutting forces, i.e. in a plane corresponding to the cross-sectional plane defined above. The angle between the resultant force $F_{res}$ and the tangential cutting force $F_t$, and thereby the angle between the resultant force and the first reference line L1, depends on the relationship between magnitude of the tangential cutting force $F_t$ and the magnitude of the radial cutting force $F_r$. In its turn, this relationship depends on the depth of cut $a_p$ and the corner radius $r_\varepsilon$ of the cutting edge. It can be concluded by simple calculations, based on principles well known to a person skilled in the art, that the relationship between magnitude of the tangential cutting force $F_t$ and the magnitude of the radial cutting force $F_r$ under normal operating conditions for internal turning is such that the angle between the resultant force $F_{res}$ and the tangential cutting force $F_t$, and thereby the angle between the resultant force and the first reference line L1, is in the range of 10-40°. For instance, when the depth of cut $a_p$ is such that $0.5 \cdot r_\varepsilon \leq a_p \leq r_\varepsilon$, the relationship between the tangential cutting force $F_t$ and the radial cutting force $F_r$ is approximately 2:1, which implies that the angle between the resultant force $F_{res}$ and the tangential cutting force $F_t$, and thereby the angle between the resultant force and the first reference line L1, is approximately 27°. When the depth of cut $a_p$ is such that $2 \cdot r_\varepsilon \leq a_p \leq 3 \cdot r_\varepsilon$, the relationship between the tangential cutting force $F_t$ and the radial cutting force $F_r$ is approximately 4:1, which implies that the angle between the resultant force $F_{res}$ and the tangential cutting force $F_t$, and thereby the angle between the resultant force and the first reference line L1, is approximately 14°.

The orientation of the second reference line L2 is intended to represent an expected orientation of the above-mentioned resultant force on the cutting element, which implies that the first actuator is arranged in the elongated body with its working axis extending substantially in parallel with an expected orientation of the resultant force on the cutting element, which in its turn allows this actuator to efficiently dampen the vibrations caused by the combined effect of the tangential and radial cutting forces on the cutting element. With this arrangement of the actuator, it will be possible to achieve an efficient vibration damping of the boring bar with the use of one single actuator.

According to an embodiment of the invention, the first actuator is so arranged in the elongated body that a centre axis of the first actuator is aligned or substantially aligned with the longitudinal axis of the elongated body. A centering of the first actuator in the elongated body is hereby achieved, which will simplify the calculations used in the control of the first actuator and thereby make it possible to achieve a damping system with good capability of responding to and damping vibrations in the boring bar in an accurate and quick manner. However, the first actuator may as an alternative be arranged with its centre axis out of alignment with the longitudinal axis of the elongated body.

According to another embodiment of the invention, the first actuator is adjustable in its rotary position in the elongated body and/or said tool part is adjustable in its rotary position in relation to the elongated body. It will hereby be possible to adjust the angular position of the first actuator in relation to the cutting element in order to optimize the damping characteristics, for instance in dependence on the depth of cut $a_p$.

According to another embodiment of the invention, the boring bar comprises a second electrically controlled vibration actuator for active vibration damping of the boring bar, the second actuator being configured to generate vibratory forces in parallel or substantially in parallel with a working axis of the second actuator, wherein the second actuator is a single-axis actuator having one single working axis, and wherein the second actuator is arranged in the elongated body in a longitudinal series with the first actuator. The second actuator will assist the first actuator in the damping of vibrations induced in the boring bar by the cutting forces acting on the cutting element and will thereby make it possible to improve the damping characteristics. The first and second actuators are preferably so arranged in the elongated body that a centre axis of the first actuator and a centre axis of the second actuator are aligned or substantially aligned with each other.

According to another embodiment of the invention, the first and second actuators are arranged with their working axes angularly offset from each other, preferably perpendicular to each other, the first actuator preferably being arranged between said tool part and the second actuator. Hereby, the different actuators are focused on counteracting vibrations in different angular directions in relation to the longitudinal axis of the boring bar, which facilitates the achievement of an efficient vibration damping.

In addition to the above-mentioned first and second actuators, the boring bar may, if so desired, also comprise one or more additional vibration actuators arranged in the elongated body in any suitable manner.

According to another embodiment of the invention, the elongated body comprises:
  an elongated main part configured for attachment to said support structure, the main part having a rear end and an opposite front end,
  a front part having a rear end facing the front end of the main part and an opposite front end, the front end of the front part being arranged to carry said tool part, and
  at least one damping module arranged between the front end of the main part and the rear end of the front part and accommodating at least one of said first and second actuators.

The above-mentioned front part of the elongated body is connected to the main part of the elongated body via the at least one damping module, wherein the at least one damping module constitutes a length section of the elongated body. Thus, the main part, the at least one damping module and the front part constitute separate and consecutively arranged length sections of the elongated body, as seen in the longitudinal direction of the elongated body. Hereby, a vibration actuator may be integrated in the elongated body of the boring bar by first mounting the actuator within a casing of an associated damping module and then securing the damping module between the main part and the front part of the elongated body, which will facilitate the assembling of the boring bar. In this case, the working direction of an actuator in relation to the point of contact between the cutting element and the workpiece may, in case of need, be adjusted by adjusting the rotary position of the associated damping module in relation to the front part of the elongated body. Furthermore, by having an actuator accommodated in a separate damping module, the damping characteristics may easily be adapted to the specific needs by modification of the damping module without having to change the other parts of the boring bar. The number of actuators in the boring bar may easily be varied in dependence on the specific needs by varying the number of damping modules arranged between the main part and the front part of the elongated body. The arrangement of an actuator in a separated damping module arranged between a main part and a front part of the elongated body also makes it easy to position the actuator close to the front end of the elongated body, which is a favourable position for the actuator due to the proximity to the cutting element where the vibrations of the boring bar are generated. Furthermore, the use of a separate damping module makes it easier to adapt this part of the boring bar to the requirements of the actuator for the purpose of maximizing the damping mass and the stroke of the actuator.

However, the elongated body of the boring bar may as an alternative lack a separate damping module of the above-mentioned type, wherein each actuator is accommodated in a cavity inside the elongated body.

The main part and/or the front part and/or the at least one damping module are with advantage cylindrical, preferably circular cylindrical.

According to an embodiment of the invention, an external periphery of the main part and an external periphery of the at least one damping module are flush or substantially flush with each other. The elongated body of the boring bar may hereby be designed with a smooth outer peripheral surface.

According to another embodiment of the invention, the at least one damping module is clamped between the main part and the front part by means of tie rods, which preferably extend through passages in the at least one damping module. Hereby, the damping module or modules may be fixed between the main part and the front part of the elongated body in a simple and reliable manner. Each one of the tie rods may have a first end fixed to the main part and an opposite second end fixed to the front part.

According to another embodiment of the invention, the elongated body comprises at least two damping modules of the above-mentioned type arranged in series with each other between the front end of the main part and the rear end of the front part, wherein the first and second actuators are arranged in different ones of these damping modules. Hereby, the first and second actuators may be integrated in the elongated body of the boring bar in a simple manner. As an alternative, the first and second actuators may be accommodated in one and the same damping module. The at least two damping modules are with advantage arranged to abut against each other. However, some kind of intermediate element may as an alternative be arranged between the at least two damping modules. The front part of the elongated body is preferably arranged with its rear end abutting against the front end of a foremost one of the at least two damping modules. However, some kind of intermediate element may as an alternative be arranged between the front part and the foremost damping module. A rearmost one of the at least two damping modules is preferably arranged with its rear end abutting against the front end of the main part of the elongated body. However, some kind of intermediate element may as an alternative be arranged between the main part and the rearmost damping module.

In order to facilitate the manufacturing of the elongated body, said at least two damping modules are with advantage of the same design and size.

Further advantageous features of the boring tool according to the present invention will appear from the description following below.

The invention also relates to a boring arrangement comprising a boring bar of the above-mentioned type and an electronic control unit configured to control the electric current to the first actuator in order to control the generation of vibratory forces in this actuator. The boring arrangement preferably also comprises at least one vibration sensor configured to generate measuring signals related to the vibration of the boring bar and to send the measuring signals to the electronic control unit, wherein the electronic control unit is configured to receive the measuring signals from the at least one vibration sensor and control the electric current to the first actuator in dependence on the measuring signals from the at least one vibration sensor in order to control the generation of vibratory forces in the first actuator in dependence on these measuring signals. If the boring bar comprises a second electrically controlled vibration actuator, the control unit may be configured also to control an electrical current to the second actuator in order to control a generation of vibratory forces in the second actuator in dependency on the measuring signals.

The at least one vibration sensor is preferably mounted to the elongated body at the front end thereof or to said tool part. Hereby, the vibrations will be detected at a position close to the cutting element, which makes it possible to efficiently counteract the vibrations induced by the cutting forces acting on the cutting element.

Further advantageous features of the boring arrangement according to the present invention will appear from the description following below.

BRIEF DESCRIPTION OF THE DRAWINGS

With reference to the appended drawings, a specific description of embodiments of the invention cited as examples follows below. In the drawings:

FIG. 8b is a perspective view from below of the cutting element of FIG. 8a, FIG. 8c is a lateral view of the cutting element of FIG. 8a, FIG. 9 is an outline diagram of a boring arrangement according to an embodiment of the invention.

DETAILED DESCRIPTION OF EMBODIMENTS OF THE INVENTION

A non-rotating boring tool 1 according to an embodiment of the present invention is illustrated in FIGS. 1-5. The boring tool 1 is to be used for performing machining operations in the form of internal turning on a rotating workpiece of metallic material. The boring tool 1 comprises a boring bar 2, which is to be fixed to a support structure 3 of a metal cutting machine (very schematically illustrated in FIGS. 9-11) in order to project in a cantilevered manner from this support structure 3. The boring bar 2 comprises an elongated body 6 configured for attachment to the support structure 3 of the metal cutting machine. The elongated body 6 has a rear end 6b and an opposite front end 6a. A longitudinal axis 7 of the elongated body extends between the rear end 6b and the front end 6a of the elongated body.

The boring tool 1 also comprises a tool part 4 provided with a cutting element 5, wherein this tool part 4 is carried by the elongated body 6 and mounted to the elongated body at the front end 6a thereof. As an alternative, the tool part 4 may be integrally formed with the front end 6a of the elongated body, which implies that the tool part 4 and the elongated body 6 are combined into a common component.

The boring bar 2 comprises an electrically controlled vibration actuator 8 for active vibration damping of the boring bar 2. This actuator 8 comprises a moveably arranged damping mass 9 and is configured, by movement of its damping mass, to generate vibratory forces in parallel or at least substantially in parallel with a working axis 10 of the actuator. The actuator 8 is a single-axis actuator having one single working axis 10.

The actuator 8 is configured to generate vibratory forces in order to counteract vibrations induced in the boring bar 2 by cutting forces acting on the cutting element 5 during machining of a rotating workpiece. The vibratory forces generated by the actuator 8 may also be used for intermittently vibrating the cutting element 5 in order to break to pieces larger metal chips cut off from a workpiece by the cutting element 5.

The actuator 8 may be of electromagnetic type, wherein the vibratory forces are electromagnetically generated. However, any other suitable type of vibration actuator may also be used.

Figures 7A, 7B:
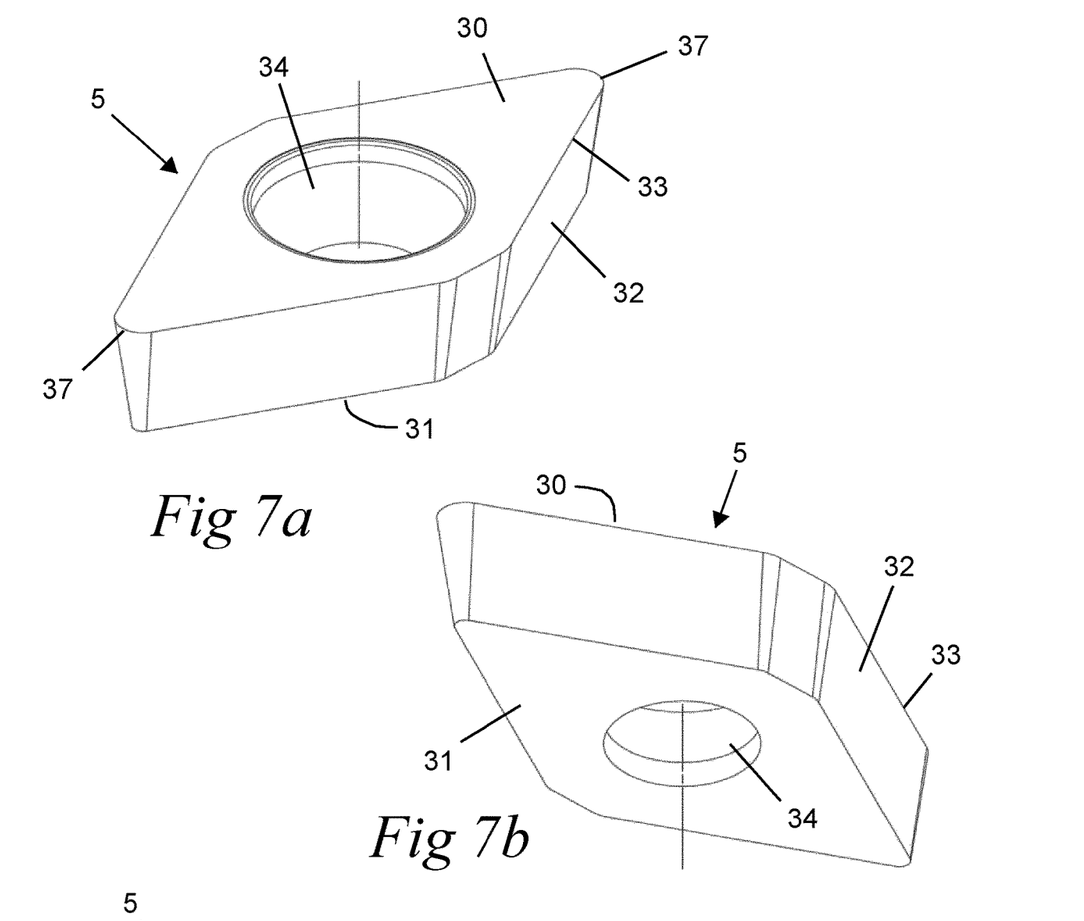
FIG. 7a is a perspective view from above of a cutting element included in the boring tool of FIG. 1.
FIG. 7b is a perspective view from below of the cutting element of FIG. 7a, FIG. 7c is a lateral view of the cutting element of FIG. 7a, FIG. 8a is a perspective view from above of an alternative cutting element.
Figure 7C:
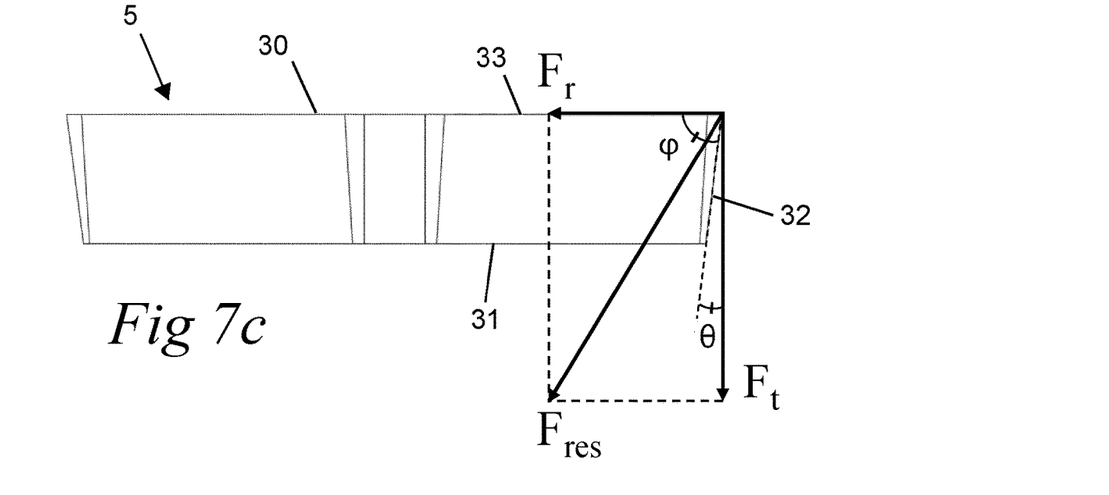
Figures 8A, 8B:
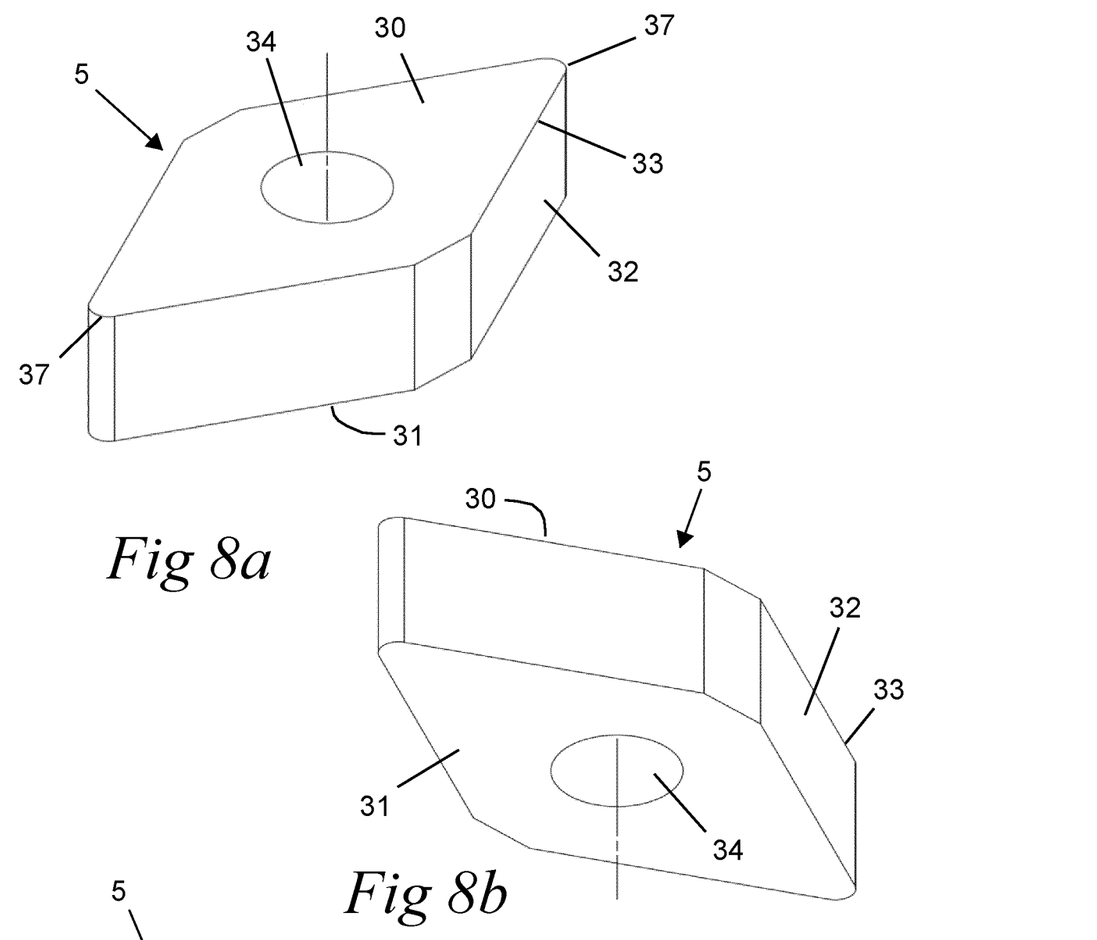
Figure 8C:
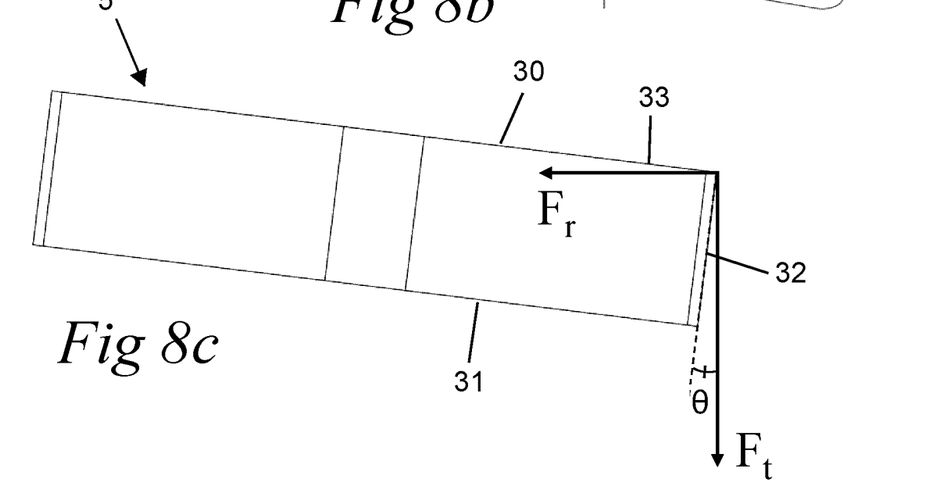

The cutting element 5 fixed to the tool part 4 may be a positive cutting element, as illustrated in FIGS. 7a-7c, or a negative cutting element, as illustrated in FIGS. 8a-8c. The cutting element 5 comprises an upper rake side 30, a bottom side 31 extending in parallel or substantially in parallel with the rake side 30 and a peripheral relief surface 32 extending between the rake side 30 and the bottom side 31. A cutting edge 33 is formed at an intersection between the rake side 30 and the relief surface 32. In the illustrated examples, the cutting edge 33 extends all around the rake side 30 along the periphery thereof. In case of a positive cutting element 5, the relief surface 32 extends at an acute angle $\varphi$ to the rake side 30, as illustrated in FIG. 7c. In case of a negative cutting element 5, the relief surface 32 extends at a right angle to the rake side 30, as illustrated in FIG. 8c.

A hole 34 extends across the cutting element 5 between the rake side 30 and the bottom side 31. The cutting element 5 is configured to be releasably mounted to the tool part 4 with the bottom side 31 of the cutting element 5 resting against a support surface 35 (see FIG. 6) on a seat provided for the cutting element in the tool part 4. The cutting element 5 is fixed to said seat in the tool part 4 by means of a fastening element 36 in the form of a screw (see FIG. 5), which extends through the hole 34 in the cutting element 5 and is engaged in a threaded hole in the support surface 35 on the seat.

In the illustrated examples, the cutting element 5 comprises two cutting corners 37 located opposite each other on opposite sides of the cutting element. The cutting element 5 is to be fixed to the tool part 4 with one of the cutting corners 37 facing outwards away from the longitudinal axis 7 of the elongated body 6, wherein the cutting element 5 is intended to make contact with a rotating workpiece via this outwardly facing cutting corner 37. During internal turning of a rotating workpiece, the boring tool 1 is normally so positioned in relation to the workpiece that the above-mentioned tangential force $F_t$ on the cutting element 5 will be directed at an angle $\theta$ of approximately 6° to the relief surface 32, as illustrated in FIGS. 7c and 8c.

Figure 6:
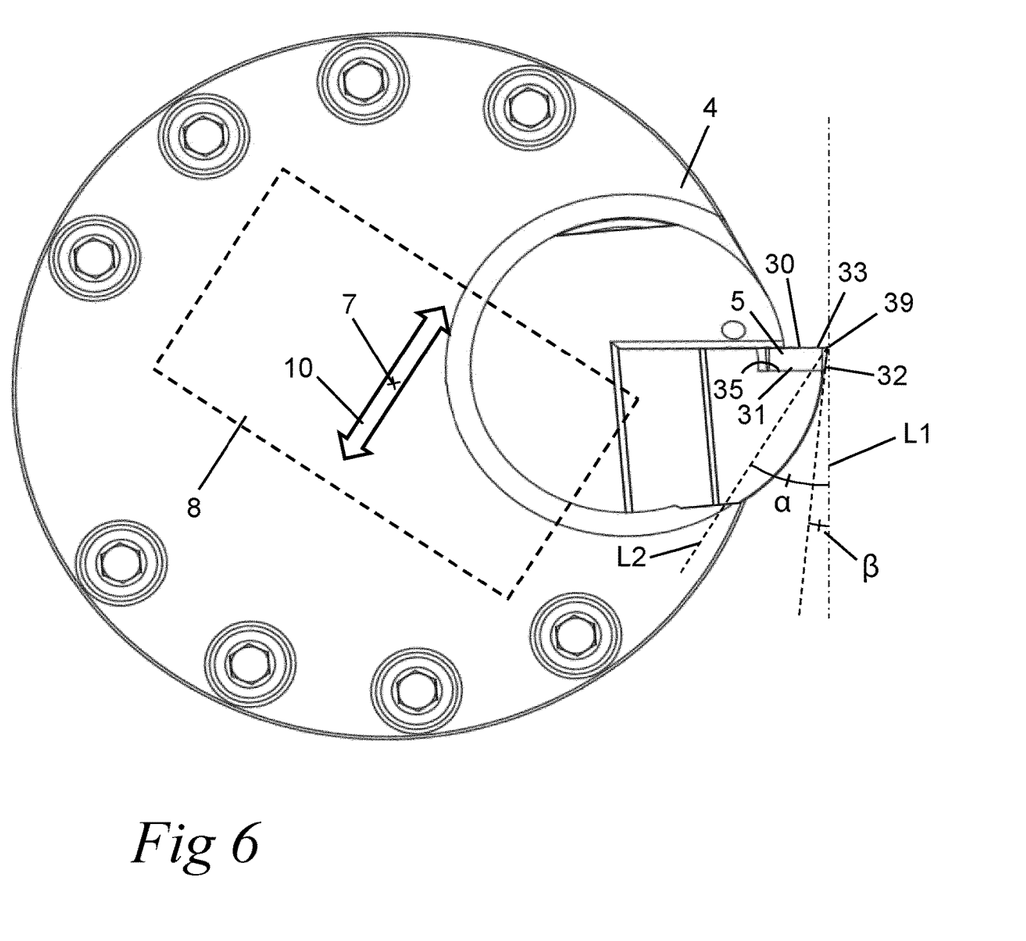
FIG. 6 is a front view of the boring tool of FIG. 1.

Straight and imaginary first and second reference lines L1, L2 (see FIG. 6) are defined in a cross-sectional plane that is perpendicular to the longitudinal axis 7 of the elongated body 6 and that intersects the cutting edge 33 in a radially outermost point 39. The first reference line L1 intersects the cutting edge 33 in the radially outermost point 39 and extends in this cross-sectional plane at an angle $\beta$ of 6° to the relief surface 32 on the outside of the cutting element 5, i.e. with this angle $\beta$ measured on the outside of the cutting element 5. Thus, when a positive cutting element 5 of the type illustrated in FIGS. 7a-7c with a relief angle of 6° is fixed to the tool part 4, the first reference line L1 may extend perpendicularly to the rake side 30 of the cutting element, as illustrated in FIG. 6.

The second reference line L2 intersects the cutting edge 33 in the radially outermost point 39 and extends between the rake side 30 and the relief surface 32 at an angle $\alpha$ in the range of 10-40° to the first reference line L1.

The actuator 8 is arranged in such a position in the elongated body 6 that its working axis 10 extends in parallel or at least substantially in parallel with the second reference line L2. Thus, when seen in the above-mentioned cross-sectional plane, the working axis 10 of the actuator 8 forms an angle of 10-40° to the first reference line L1.

The actuator 8 is preferably so arranged in the elongated body 6 that a centre axis 11 of the actuator is aligned or substantially aligned with the longitudinal axis 7 of the elongated body.

The working axis 10 of the actuator 8 extends perpendicularly to the centre axis 11 thereof. Furthermore, the working axis 10 of the actuator 8 extends in a cross-sectional plane that is perpendicular to the longitudinal axis 7 of the elongated body 6.

In the embodiment illustrated in FIGS. 1-5, the elongated body 6 of the boring bar 2 is made up of separate parts 12, 13, 14, which are connected to each other and together form the elongated body 6, wherein these parts 12, 13, 14 constitute separate length sections, i.e. separate segments, of the elongated body 6. Thus, these parts 12, 13, 14 constitute consecutive sections of the elongated body 6 of the boring bar, as seen in the longitudinal direction thereof. In this case, the elongated body 6 comprises an elongated main part 12 configured for attachment to the support structure 3 of the metal cutting machine. This main part 12 has a rear end 12b and an opposite front end 12a. The main part 12 is preferably tubular and it is to be attached to said support structure 3 at its rear end 12b. In the illustrated embodiment, the main part 12 is cylindrical and has a circular cross-sectional shape. However, the main part 12 may also have any other suitable cross-sectional shape, such as for instance an elliptical or a polygonal cross-sectional shape.

The elongated body 6 illustrated in FIGS. 1-5 further comprises a front part 13. This front part 13 has a rear end 13b facing the front end 12a of the main part 12 and an opposite front end 13a. The front end 13a of the front part is arranged to carry the above-mentioned tool part 4. Thus, this tool part 4 is attached to the front part 13 of the elongated body at the front end 13a thereof. As an alternative, the tool part 4 may be integrally formed with the front part 13, which implies that the tool part 4 and the front part 13 are combined into a common component. In the illustrated embodiment, the front part 13 is cylindrical and has a circular cross-sectional shape. However, the front part 13 may also have any other suitable cross-sectional shape, such as for instance an elliptical or a polygonal cross-sectional shape.

The elongated body 6 illustrated in FIGS. 1-5 also comprises a damping module 14 arranged between the front end 12a of the main part 12 and the rear end 13b of the front part 13, wherein this damping module 14 has a rear end 14b facing the main part 12 and an opposite front end 14a facing the front part 13. The front part 13 is connected to the main part 12 via the damping module 14. In the illustrated embodiment, the damping module 14 is cylindrical and has a circular cross-sectional shape. However, the damping module 14 may also have any other suitable cross-sectional shape, such as for instance an elliptical or a polygonal cross-sectional shape.

The damping module 14 accommodates the actuator 8, wherein the actuator 8 is arranged in a housing 15 of the damping module, the damping mass 9 of the actuator 8 being moveable in relation to this housing 15. In the illustrated embodiment, the damping mass 9 is moveable in relation to the housing 15 of the damping module 14 against the action of return springs 16 arranged on opposite sides of the damping mass 9.

Figure 1:
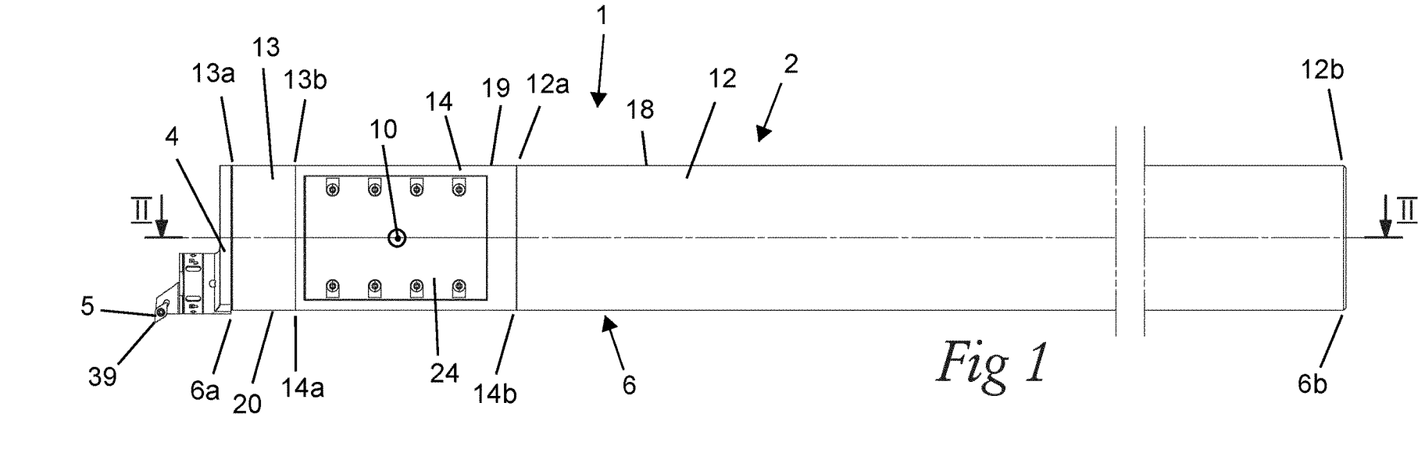
FIG. 1 is a lateral view of a non-rotating boring tool according to an embodiment of the present invention.
Figure 2:
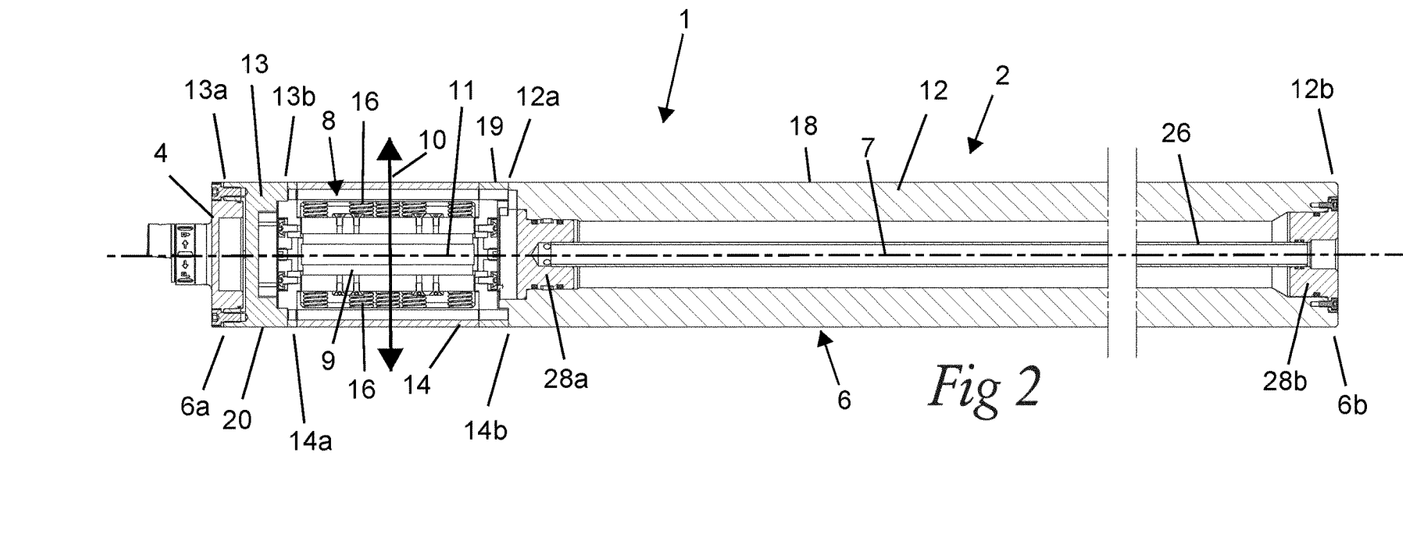
FIG. 2 is a longitudinal section according to the line II-II in FIG. 1.
Figure 3:
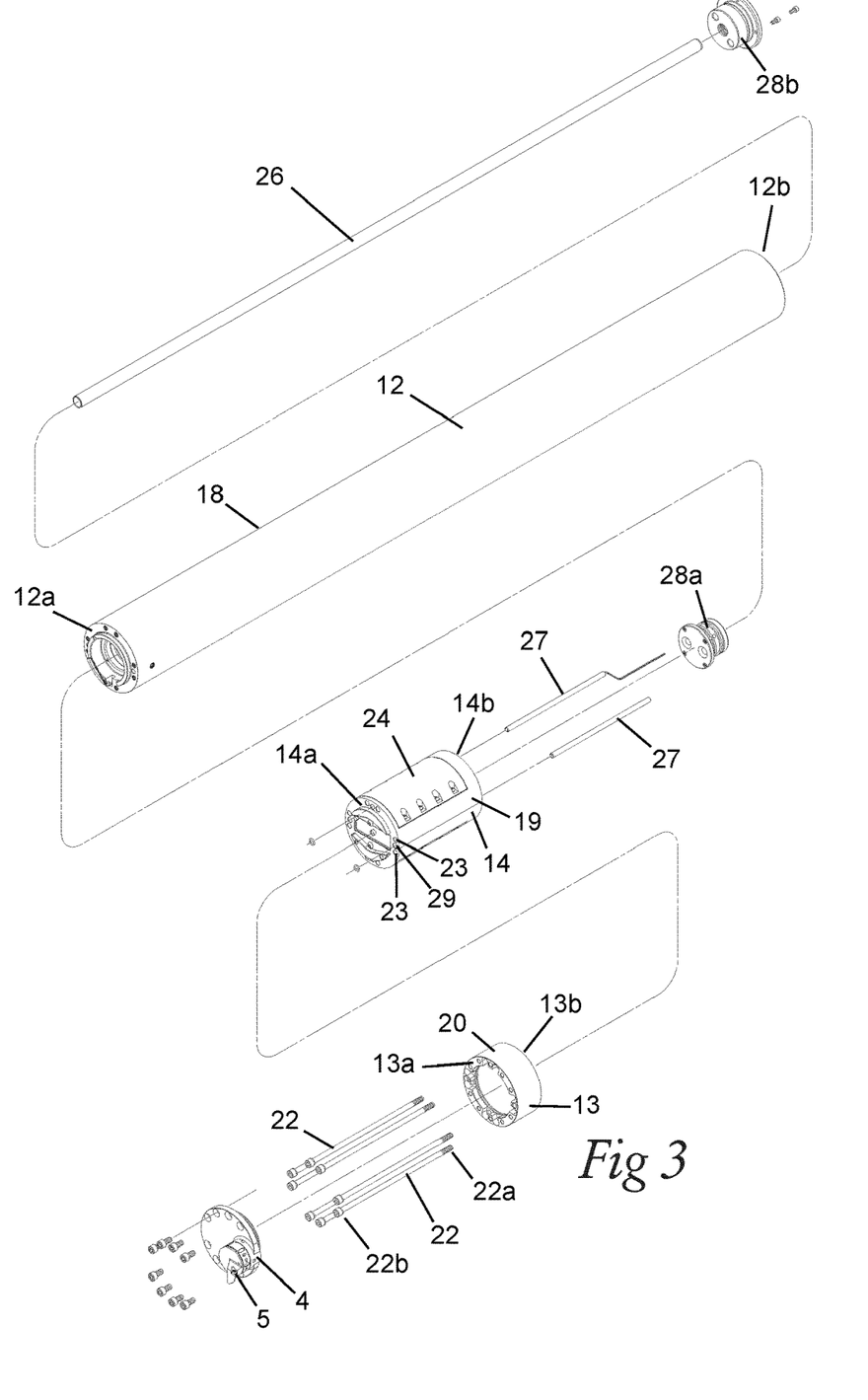
FIG. 3 is an exploded view of the boring tool of FIG. 1.
Figure 4:
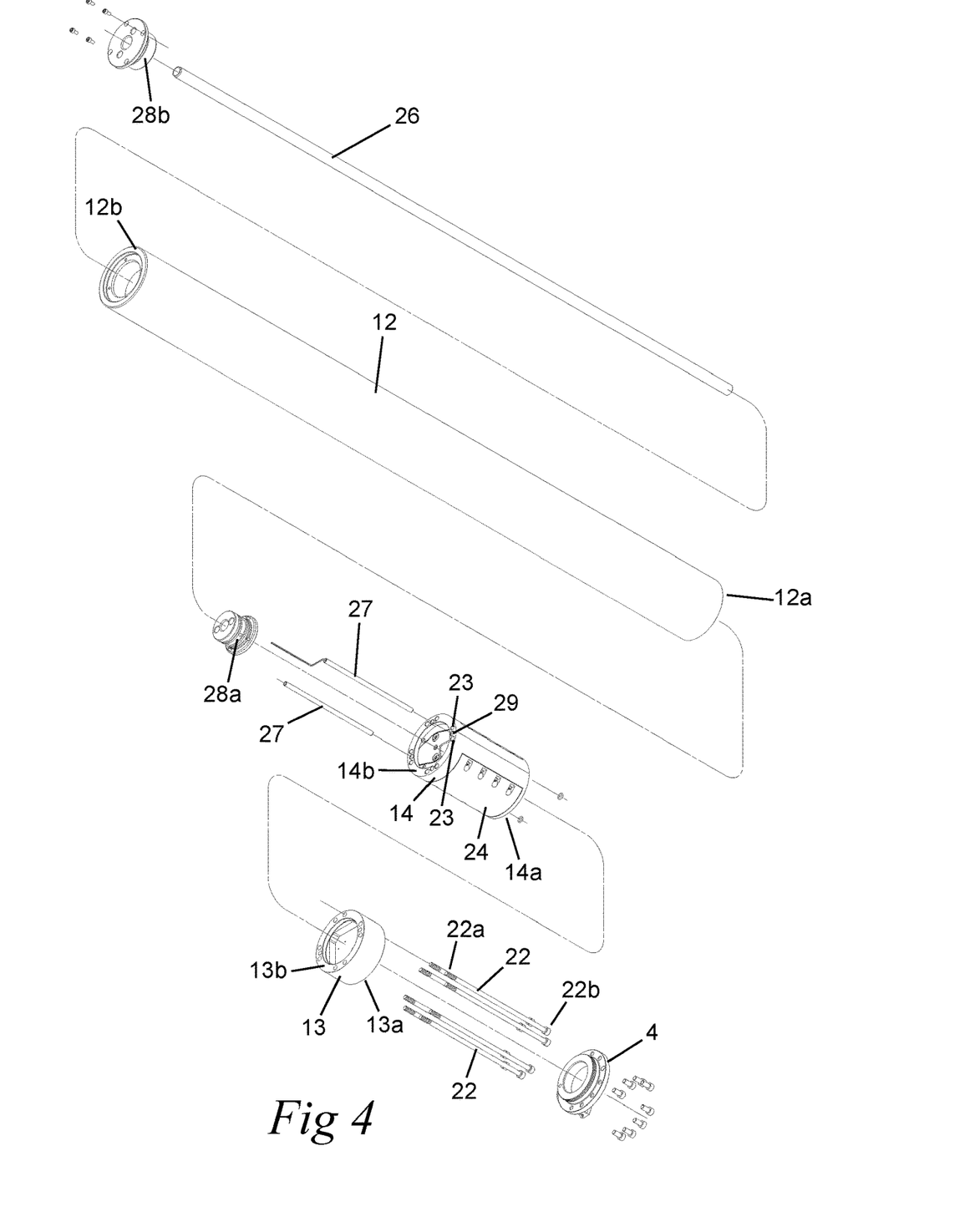
FIG. 4 is an exploded view from another direction of the boring tool of FIG. 1.
Figure 5:
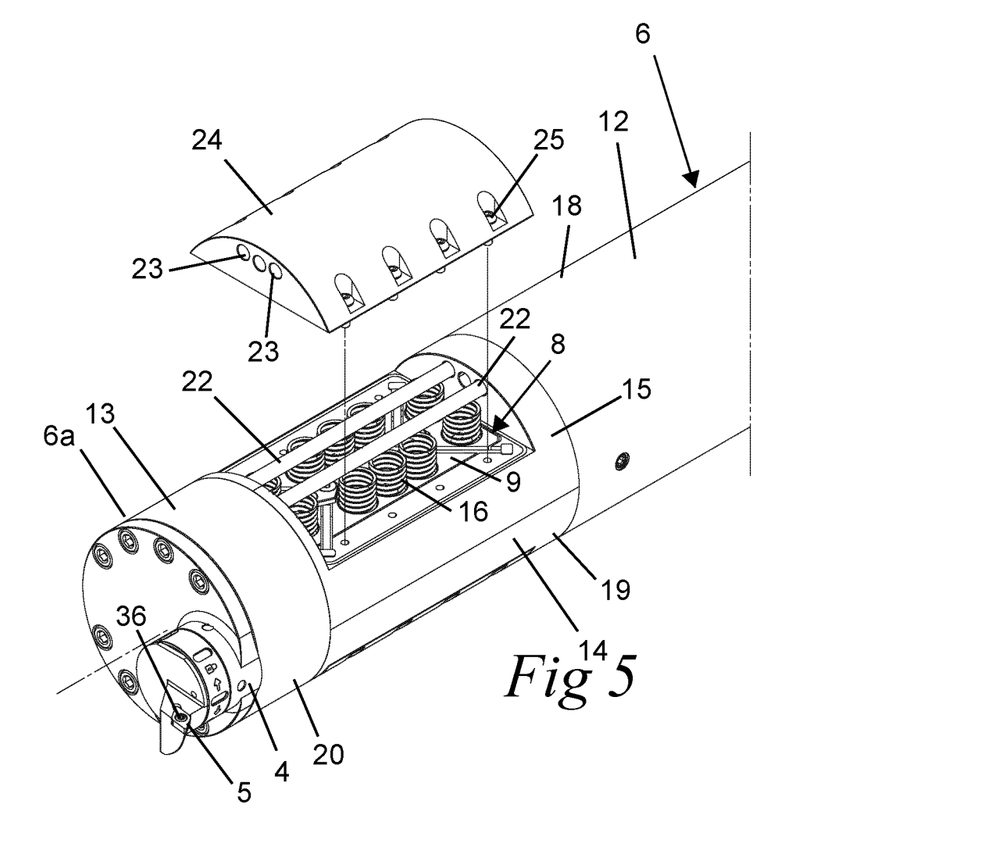
FIG. 5 is a perspective view of a front end of the boring tool of FIG. 1.

An external periphery 18 of the main part 12 and an external periphery 19 of the damping module 14 are with advantage flush or substantially flush with each other, as illustrated in FIGS. 1, 2 and 5. Furthermore, an external periphery 20 of the front part 13 is with advantage flush or substantially flush with the external periphery 19 of the damping module 14.

In order to facilitate maintenance and repair of the boring bar 2, the main part 12, the damping module 14 and the front part 13 are preferably detachably mounted to each other. In the illustrated embodiment, the damping module 14 is clamped between the main part 12 and the front part 13 by means of tie rods 22. Each tie rod 22 has a first end 22a fixed to the main part 12 and an opposite second end 22b fixed to the front part 13. Furthermore, each tie rod 22 extends through passages 23 in the damping module 14. The different parts 12, 13, 14 of the elongated body 6 may as an alternative be mounted to each other in any other suitable manner.

In the illustrated embodiment, the actuator 8 in the damping module 14 is accessible through two openings on opposite sides of the damping module, wherein each opening is covered by a detachably mounted cover 24, which forms part of the external periphery 19 of the damping module and which is secured in the associated opening by means of fastening elements 25 in the form of screws. Passages 23 for some of the above-mentioned tie rods 22 may be provided in the covers 24.

In the illustrated embodiment, cooling fluid is supplied to the tool part 4 through a first feed pipe 26, which extends axially through the main part 12 of the elongated body 6, and at least one second feed pipe 27, which extends between the main part 12 and the front part 13 of the elongated body in parallel with the tie rods 22. In the illustrated example, the boring bar 2 is provided with two such second feed pipes 27. The first feed pipe 26 is fixed to the main part 12 of the elongated body by means of a first end piece 28a fixed to the main part 12 at the front end 12a thereof and a second end piece 28b fixed to the main part 12 at the rear end 12b thereof. Each one of the second feed pipes 27 is connected to the first feed pipe 26 via internal channels in the first end piece 28a. Furthermore, each one of the second feed pipes 27 may be arranged to extend through mutually aligned passages 29 in the damping module 14.

In order to make possible an adjustment of the angular position of the working axis 10 of the actuator 8 in relation to the cutting element 5, the front part 13 of the elongated body 6 may be adjustable in its rotary position in relation to the damping module 14, which implies that the front part 13 is attachable to the damping module 14 in different selectable rotary positions in relation to the damping module. As an alternative to or in combination with such a rotary adjustability of the front part 13 in relation to the damping module 14, the tool part 4 provided with the cutting element 5 may be adjustable in its rotary position in relation to the front part 13 of the elongated body, which implies that the tool part 4 is attachable to the front part 13 in different selectable rotary positions in relation to the front part. The damping module 14 may also be arranged such that its actuator 8 may be adjustable in its rotary position in relation to a casing of the damping module. Rotary position of the actuator 8, i.e. its angular position in relation to the cutting element 5, may be stepless or stepwise adjustable. An optimal rotary position of the actuator may be calculated in advance, i.e. before a machining process of the workpiece is started, based on the cutting data and/or properties of the workpiece material and/or cutting conditions. By optimal rotary position of the actuator is meant a rotary position in which the actuator has its working axis oriented in parallel with the resultant force $F_{res}$. However, the rotary position of the actuator may also actively and continuously be controlled and adjusted during the machining process, for example with a motor of suitable kind, preferably arranged/comprised in the boring tool, and controlled by an electronic control unit configured to control an electric current to the motor in order to control and adjust an angular position of the motor and by that adjust the rotary position of the actuator to its optimal rotary position. The electronic control unit configured to control the electric current to the motor may be the same electronic control unit 41 or a separate one.

Figure 9:
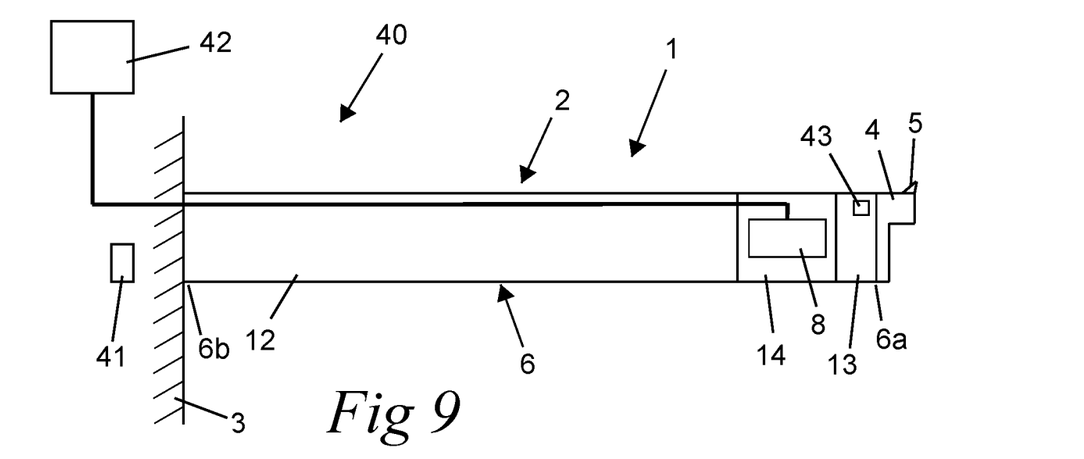
Figure 10:
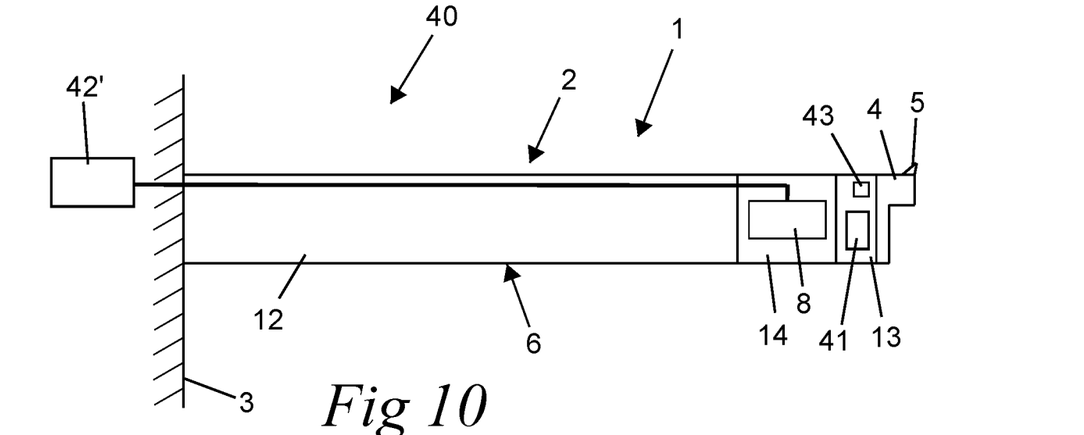
FIG. 10 is an outline diagram of a boring arrangement according to an alternative embodiment of the invention.
Figure 11:
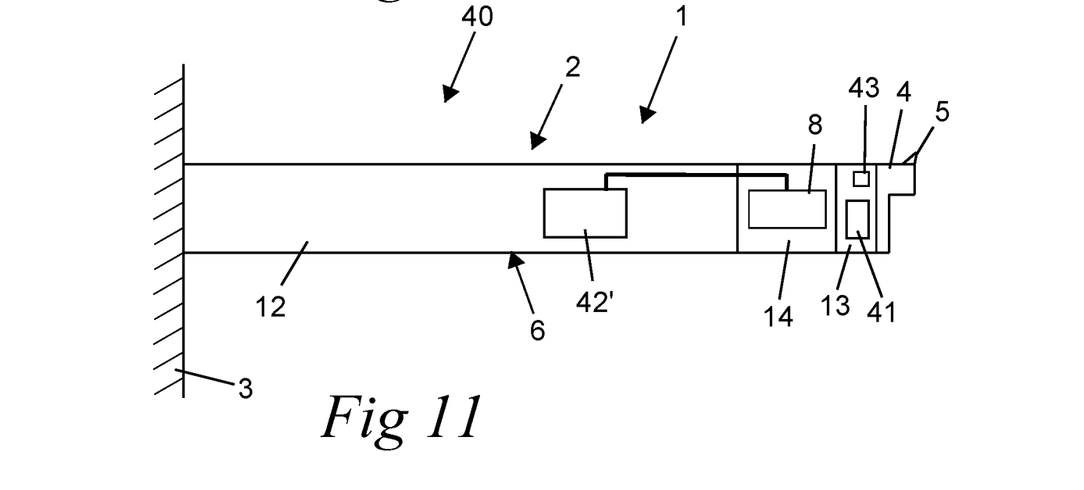
FIG. 11 is an outline diagram of a boring arrangement according to another alternative embodiment of the invention.

Different embodiments of a boring arrangement 40 comprising a boring bar 2 of the type described above are very schematically illustrated in FIGS. 9-11. The boring arrangement 40 further comprises an electronic control unit 41, which is configured to control the supply of electric current to the actuator 8 in the elongated body 6 in order to control the generation of vibratory forces in this actuator. The electric current is supplied to the actuator 8 from a power source, which may be an external power source 42, as illustrated in FIG. 9, or a power supply unit 42' mounted to the elongated body 6, as illustrated in FIG. 11, or to the support structure 3 or any other part of the metal cutting machine, as illustrated in FIG. 10. The power supply unit 42' comprises at least one energy storage member, for instance in the form of a battery, for storing electric energy. The electronic control unit 41 may be mounted to the front part 13 of the elongated body 6, as illustrated in FIGS. 10 and 11, or to any other part of the elongated body. As a further alternative, the electronic control unit 41 may be mounted to the support structure 3 or any other part of the metal cutting machine, as illustrated in FIG. 9.

The boring arrangement 40 further comprises at least one vibration sensor 43, for instance in the form of an accelerometer, which is configured to generate measuring signals related to the vibration of the boring bar 2 and to send the measuring signals to the electronic control unit 41 through a wireless connection or a cable connection. Said at least one vibration sensor 43 is preferably mounted to the front part 13 of the elongated body 6 or to the tool part 4, but it may as an alternative be mounted to any other suitable part of the elongated body 6.

The electronic control unit 41 is configured to receive the measuring signals from the at least one vibration sensor 43 and to control the supply of electric current to the actuator 8 in dependence on these measuring signals in order to control the generation of vibratory forces in the actuator 8 in dependence on these measuring signals and thereby counteract the vibrations induced in the boring bar 2 by the cutting forces $F_r$, $F_t$ acting on the cutting element 5 during machining of a workpiece.

In the embodiment illustrated in FIGS. 1-5, the boring bar 2 comprises only one vibration actuator 8. However, the boring bar 2 may as alternative comprise one or more additional electrically controlled vibration actuators for active vibration damping of the boring bar.

Figure 12:
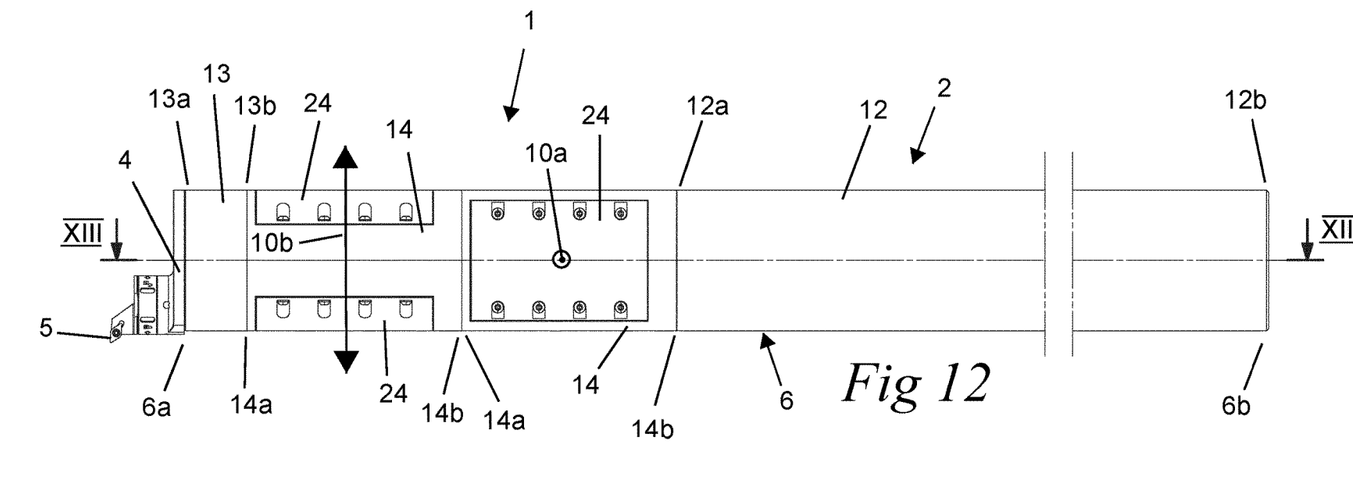
FIG. 12 is a lateral view of a non-rotating boring tool according to an alternative embodiment of the invention.
Figure 13:
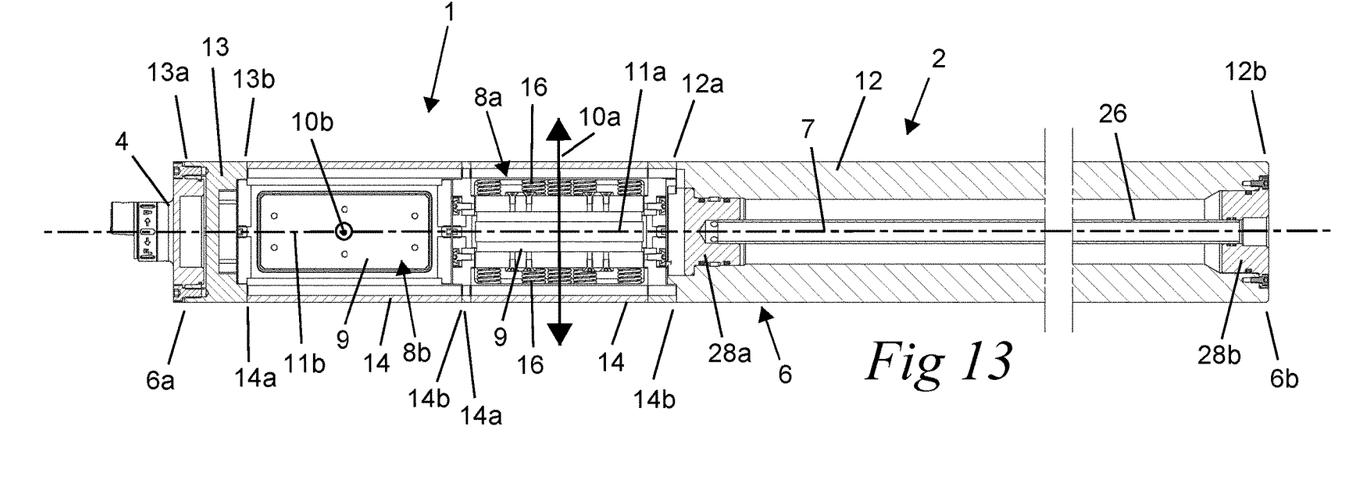
FIG. 13 is a longitudinal section according to the line XIII-XIII in FIG. 12.

In the embodiment illustrated in FIGS. 12 and 13, the boring bar 2 comprises first and second electrically controlled vibration actuators 8a, 8b for active vibration damping of the boring bar 2. The first vibration actuator 8a has the same design as the actuator 8 described above with reference to FIGS. 1-5 and it is arranged in the elongated body 6 in the same manner as this actuator 8. Thus, the first actuator 8a is a single-axis actuator having one single working axis 10a and it is arranged in the elongated body 6 with its working axis 10a extending in parallel with or at least substantially in parallel with the above-mentioned second reference line L2. The second actuator 8b is likewise a single-axis actuator having one single working axis 10b and it may be an actuator of the same type as the first actuator 8a. The second actuator 8b is arranged in the elongated body 6 in a longitudinal series with the first actuator 8a. Thus, the first and second actuators 8a, 8b are arranged consecutively in the longitudinal direction of the elongated body 6, preferably with a centre axis 11a of the first actuator 8a and a centre axis 11b of the second actuator 8b aligned or at least substantially aligned with each other.

The first and second actuators 8a, 8b are arranged with their working axes 10a, 10b angularly offset from each other, preferably perpendicular to each other. In the example illustrated in FIGS. 12 and 13, the second actuator 8b is arranged between the tool part 4 and the first actuator 8a. However, the first and second actuators 8a, 8b are with advantage arranged in the opposite order, i.e. with the first actuator 8a arranged between the tool part 4 and the second actuator 8b.

In the embodiment illustrated in FIGS. 12 and 13, the elongated body 6 comprises a main part 12 and a front part 13 of the type described above with reference to FIGS. 1-5. The elongated body 6 illustrated in FIGS. 12 and 13 further comprises two damping modules 14 of the type described above with reference to FIGS. 1-5, wherein these damping modules 14 are arranged in series with each other between the front end 12a of the main part 12 and the rear end 13b of the front part 13. In this case, the first and second actuators 8a, 8b are arranged in different damping modules 14. However, the first and second actuators 8a, 8b may as an alternative be arranged in one and the same damping module 14.

In the embodiment illustrated in FIGS. 12 and 13, the damping modules 14 abut directly against each other, wherein the rear end 14b of a foremost one of the damping modules abuts against the front end 14a of the other damping module, i.e. the rearmost damping module. As illustrated in FIGS. 12 and 13, the front part 13 may be arranged with its rear end 13b abutting directly against the front end 14a of the foremost damping module and the rearmost damping module may be arranged with its rear end 14b abutting directly against the front end 12a of the main part 12.

When the elongated body 6 is provided with more than two vibration actuators, the elongated body may comprise more than two damping modules 14. When the damping modules 14 are two or more in number, they may be arranged such that their respective rotary positions may be adjustable in relation to each other.

The invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:

1. A non-rotating boring tool for internal turning comprising:
   a boring bar having an elongated body configured for attachment to a support structure of a metal cutting machine, the elongated body having a rear end and an opposite front end; and
   a tool part provided with a cutting element, wherein the tool part is detachably attached to or integrally formed with the front end of the elongated body, the cutting element including a rake side, a relief surface and a cutting edge formed at an intersection between the rake side and the relief surface, wherein when seen in a cross-sectional plane that is perpendicular to a longitudinal axis of the elongated body and intersecting the cutting edge in a radially outermost point a straight and imaginary first reference line intersects the cutting edge in the radially outermost point and extends at an angle ($\beta$) of 6° to the relief surface on the outside of the cutting element, and
   a straight and imaginary second reference line intersects the cutting edge in the radially outermost point and extends between the rake side and the relief surface at an angle ($\alpha$) of 10-40° to the first reference line, wherein the boring bar includes a first electrically controlled vibration actuator for active vibration damping of the boring bar, the first actuator being configured to generate vibratory forces in parallel or substantially in parallel with a working axis of the first actuator, wherein the first actuator is a single-axis actuator having one single working axis, and wherein the first actuator is arranged in the elongated body with the working axis extending in parallel or substantially in parallel with said second reference line.

2. The non-rotating boring tool according to claim 1, wherein the first actuator is arranged in the elongated body such that a centre axis of the first actuator is aligned or substantially aligned with the longitudinal axis of the elongated body.

3. The non-rotating boring tool according to claim 1, wherein the first actuator is mounted in the elongated body in an adjustable rotary position and/or wherein said tool part is rotationally adjustable in relation to the elongated body.

4. The non-rotating boring tool according to claim 1, wherein the boring bar includes a second electrically controlled vibration actuator for active vibration damping of the boring bar, the second actuator being configured to generate vibratory forces in parallel or substantially in parallel with a working axis of the second actuator, wherein the second actuator is a single-axis actuator having one single working axis, and wherein the second actuator is arranged in the elongated body in a longitudinal series with the first actuator.

5. The non-rotating boring tool according to claim 4, wherein the first and second actuators are arranged such that respective working axes thereof angularly offset from each other, the first actuator being arranged between said tool part and the second actuator.

6. The non-rotating boring tool according to claim 5, wherein the first and second actuators are arranged such that the working axes are perpendicular to each other.

7. The non-rotating boring tool according to claim 4, wherein the first and second actuators are arranged in the elongated body such that a centre axis of the first actuator and a centre axis of the second actuator are aligned or substantially aligned with each other.

8. The non-rotating boring tool according to claim 4, wherein the elongated body includes an elongated main part configured for attachment to said support structure, the main part having a rear end and an opposite front end, a front part having a rear end facing the front end of the main part and an opposite front end, the front end of the front part being arranged to carry said tool part, and at least one damping module arranged between the front end of the main part and the rear end of the front part and accommodating the first actuator and/or the second actuator, and wherein the front part of the elongated body is connected to the main part thereof via the at least one damping module, wherein the at least one damping module constitutes a length section of the elongated body.

9. The non-rotating boring tool according to claim 8, wherein the main part and/or the front part and/or the at least one damping module are cylindrical.

10. The non-rotating boring tool according to claim 8, wherein an external periphery of the main part and an external periphery of the at least one damping module are flush or substantially flush with each other.

11. The non-rotating boring tool according to claim 8, wherein the at least one damping module is clamped between the main part and the front part by means of tie rods, which preferably extend through passages in the at least one damping module.

12. The non-rotating boring tool according to claim 8, wherein the first and second actuators are accommodated in a same damping module.

13. The non-rotating boring tool according to claim 8, wherein the elongated body includes at least two such damping modules arranged in series with each other between the front end of the main part and the rear end of the front part, wherein the first and second actuators are arranged in different ones of these damping modules.

14. A boring arrangement for internal turning-comprising:
 a non-rotating boring tool according claim 1; and
 an electronic control unit configured to control the electric current to the first actuator in order to control the generation of vibratory forces in the first actuator.

15. The boring arrangement according to claim 14, further comprising at least one vibration sensor configured to generate measuring signals related to the vibration of the boring bar and to send the measuring signals to the electronic control unit, and wherein the electronic control unit is configured to receive the measuring signals from the at least one vibration sensor, and wherein the electronic control unit is configured to control the electric current to the first actuator in dependence on the measuring signals from the at least one vibration sensor in order to control the generation of vibratory forces in the first actuator in dependence on these measuring signals.

* * * * *